United States Patent [19]

Lee

[11] Patent Number: 4,467,655
[45] Date of Patent: Aug. 28, 1984

[54] QUAD-GATE DEMODULATOR CIRCUIT FOR CAPACITIVE TRANSDUCERS

[75] Inventor: Chen Y. Lee, Troy, Mich.

[73] Assignee: C & J Industries, Inc., Troy, Mich.

[21] Appl. No.: 422,234

[22] Filed: Sep. 23, 1982

[51] Int. Cl.³ .................. G01L 19/04; H03K 9/02
[52] U.S. Cl. ............................. 73/724; 73/708; 324/166
[58] Field of Search ............ 329/204, 166; 73/724, 73/708, 718

[56] References Cited

U.S. PATENT DOCUMENTS

| | | | |
|---|---|---|---|
| 3,965,744 | 6/1976 | Gutjahr et al. | 73/708 |
| 4,289,035 | 9/1981 | Lee et al. | 73/724 X |
| 4,387,601 | 6/1983 | Azegami et al. | 73/724 |

Primary Examiner—Gerald Goldberg
Assistant Examiner—Anna M. Schrichte
Attorney, Agent, or Firm—Krass & Young

[57] ABSTRACT

A quad-gate demodulator circuit for capacitive transducers in which analog gate devices replace the diodes of a prior art diode-quad bridge circuit. This improvement eliminates the temperature and ratiometricity errors associated with the diode-quad circuit.

12 Claims, 5 Drawing Figures

QUAD-GATE DEMODULATOR CIRCUIT FOR CAPACITIVE TRANSDUCERS

INTRODUCTION

This invention relates to demodulation circuits for capacitive transducers and particularly to improvements which eliminate temperature errors and other disadvantages in prior art circuits using diodes in a bridge arrangement.

BACKGROUND OF THE INVENTION

It is known to use a capacitance-type transducer for the measurement of engine manifold pressure and other quantities such as fluid level, and position and/or proximity of various items. One known transducer comprises a capsule made up of quartz plates which are assembled in a normally parallel and spaced apart arrangement with capacitor electrodes bonded to the inside facing surfaces to form a pair of capacitors. When the quartz plates are subjected to varying pressure, they flex so as to vary the spacing between the capacitor electrodes and to cause a measurable capacitive change.

To generate an electrical signal representing the capacitance change, the transducer is connected to a demodulator circuit comprising an alternating excitation voltage source, a four-diode bridge circuit, and an output filter capacitor across which a DC voltage is developed in proportion to the capacitance change. A more complete explanation of the quartz capsule pressure transducer may be found in the SAE Technical Paper Series, Paper No. 810374 "Quartz Capsule Pressure Transducer for the Automotive Industry", presented at the International Congress and Exposition in Detroit Feb. 23–27, 1981. The diode-quad demodulator circuit is more fully described in U.S. Pat. No. 3,869,676 issued Mar. 4, 1975 and assigned to the United States of America as represented by the NASA administrator.

There are certain disadvantages associated with the diode-quad bridge circuit, primarily as a result of the use of the diodes. There is, of course, a voltage drop associated with each of the diodes and the cumulative voltage drop limits the effective amplitude of the excitation voltage and, thus, the detection sensitivity. In addition, the diodes introduce a temperature sensitive component into the circuit transfer function which requires compensation in applications where wide temperature swings are encountered and high accuracy is required. One approach to compensation is disclosed in U.S. Pat. No. 4,289,035 issued Sept. 15, 1981 to Chen Y. Lee and assigned to the Bendix Corporation.

Overall, it is generally recognized as difficult to detect small capacitance changes because of the presence of noise due to inherent capacitive components of connectors and other circuit elements, stray fields, and the effect of proximity to other bodies carrying varying charge levels. The diode-quad demodulator circuit has significant advantages but, as explained above, also suffers from various limitations. Therefore there exists a need for improved demodulators for capacitance-type signal generators or transducers.

SUMMARY OF THE INVENTION

A principal objective of the present invention is to provide an improved demodulator circuit for variable-capacitance transducers such as the quartz plate capacitance transducer, which demodulator circuit improves signal to noise ratios and eliminates the temperature induced error and other disadvantages of the diode-quad bridge circuit. In brief, this is accomplished by providing a demodulator circuit for capacitive transducers which circuit comprises a bridge arrangement of four analog gate devices interconnected with the transducer capacitors and which can be rendered individually conducting in timed relation to an excitation voltage, a gate system synchronized with the excitation voltage to render the gates conductive in opposite pairs during portions of respective half cycles of the excitation voltage waveform, and an output filter element across which an output voltage related to capacitance change is generated. Through the present invention the temperature sensitive component of the circuit transfer function is eliminated along with the necessity for compensation of the type described in the Lee U.S. Pat. No. 4,289,035. In addition, the developed voltage has no limit as in the diode-quad bridge arrangement.

It is to be understood that the term "analog gate device", as used herein, refers to any controllable device capable of switching rapidly between high and low resistance states. Examples are C-MOS gates, junction devices such as transistors, and mechanical or quasimechanical devices such as reed switches.

DETAILED DESCRIPTION OF THE SPECIFIC EMBODIMENT

Figure 1:
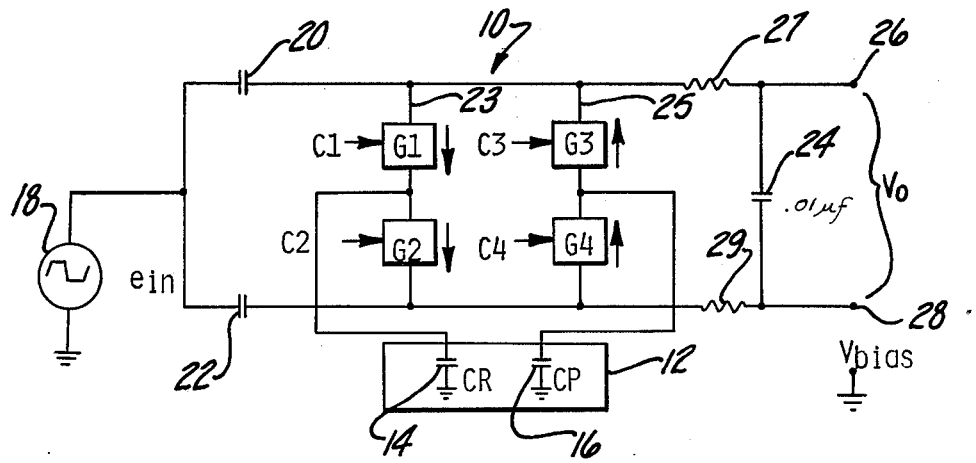
FIG. 1 is a simplified circuit drawing of a demodulator circuit according to the present invention.
Figure 2:
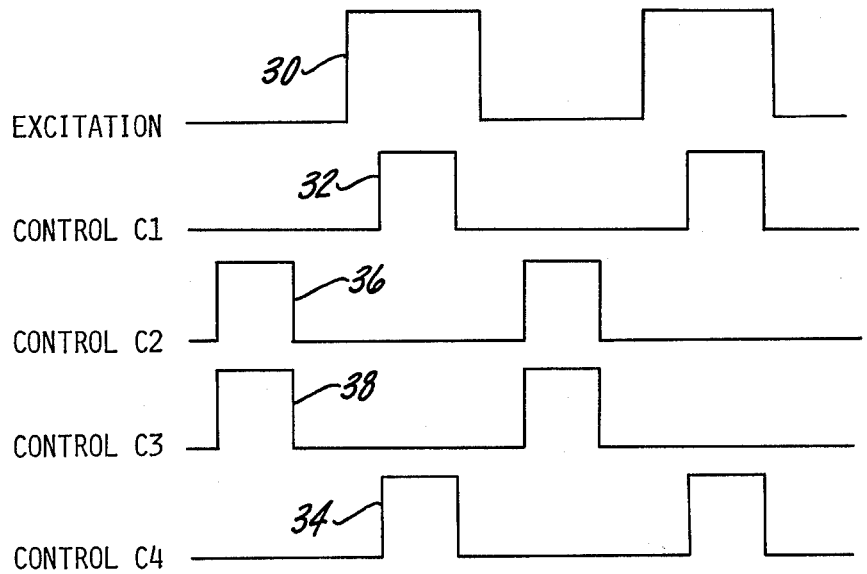
FIG. 2 is a waveform diagram showing the phase relationship between the excitation voltage and the control signals for the circuit of FIG. 1.

Referring to FIGS. 1 and 2 of the drawings, the invention is illustratively embodied in a demodulator circuit 10 for a variable-capacitance transducer capsule 12 comprising a reference capacitor 14 and a primary capacitor 16 which vary differently in response to a measured quantity such as pressure, liquid level, position, proximity or such other quantity as is amenable to measurement through capacitance changes. The demodulator circuit 10 comprises a source 18 of alternating excitation voltage, essentially a squarewave, connected through coupling capacitors 20 and 22 to the opposite ends of the legs 23 and 25 of a quad-gate bridge circuit. Leg 23 comprises C-MOS gates G1 and G2 connected in series and capable of switching from a high-resistance state or condition to a low-resistance state or condition when supplied with gate control signals at gate control terminals C1 and C2. The direction of conducted current in the circuit is indicated by the small arrows. Bridge leg 25 comprises C-MOS gates G3 and G4 connected in series and having gate control terminals C3 and C4. One electrode of reference capacitor 14 is connected to the junction between gates G1 and G2 and one electrode of the primary measurement capacitor 16 is similarly connected to the junction between gates G3 and G4. The other electrodes of both capacitors 14 and 16 are grounded. Circuit 10 further comprises an output filter capacitor 24 connected to the legs 23 and 25 through resistors 27 and 29. The output appears across output terminals 26 and 28, of which terminal 28 is connected to a bias source as shown.

As hereinafter described in greater detail with reference to FIGS. 4 and 5 the circuit of FIG. 1 further comprises means for applying control signals to the gate control terminals C1, C2, C3 and C4 in timed relationship with the excitation voltage from source 18 such that gates G1 and G4 are simultaneously conductive during a portion of the positive polarity of the excitation voltage and gates G2 and G3 are conducting during a portion of the negative polarity portion of the excitation signal.

The excitation voltage from source 18 is represented by waveform 30 in FIG. 2. As previously mentioned, this is essentially a squarewave of well controlled amplitude. The control signal waveform for control terminal C1 is represented by waveform 32; i.e., the waveform 32 is a narrow positive voltage pulse synchronized with the center of the positive polarity portion of waveform 30 so as to render gate G1 conducting during the center portion of the positive polarity excitation voltage half-cycle.

Control signal C4 is represented by waveform 34 and is identical in phase, and amplitude with control signal C1 so as to render gate G4 conductive at the same time as gate G1 is conducting. Waveforms 36 and 38 represent the control signals applied to terminals C2 and C3 and it is apparent that these waveforms render gates G2 and G3 simultaneously conductive during the center portion of the negative polarity half-cycle of the excitation voltage waveform 30.

In operation, gates G1 and G4 are rendered simultaneously conductive by control signals C1 and C4 to charge capacitors 14 and 16 during a portion of the positive polarity of the excitation voltage waveform 30. The gates G1 and G4 are rendered non-conducting before the excitation voltage goes negative. After the excitation voltage goes negative, gates G2 and G3 are rendered conducting to allow the capacitors 14 and 16 to discharge. Assuming terminal 28 is biased to V bias, and the voltage across terminals 26 amd 28 is $V_o$, since the net charge transfer to capacitors 20 and 22 should be zero in the steady state, the charge transfer from gates G1 and G2 should be equal to the charge transfer from G4 to G3. The amounts of the charge transfers are related to $C_r$ and $C_p$ as well as the peak and valley values of the excitation voltage. The overall transfer function of the circuit of FIG. 1 is given by the expression:

$$V_o = V_p(C_p - C_r)/(C_p + C_r) \quad (1)$$

Where:

$V_o$ is the output voltage, and $V_p$ is the peak-to-peak value of the excitation voltage.

From this expression it can be seen that as the primary capacitor 16 increases relative to the reference capacitor 14 and output voltage $V_o$ across capacitor 24 and across terminals 26 and 28 is developed. It can also be seen that the expression contains no diode drop component to introduce a temperature sensitive component as in the diode-quad bridge which requires compensation. This is to be contrasted with the transfer function of the prior art circuit using diodes and which is defined by the expression:

$$V_o = (V_p - 2V_d)(C_p - C_r)/(C_p + C_r) \quad (2)$$

Where:

$V_o$ = Output voltage $V_p$ = Peak-to-peak voltage of the excitation waveform $V_d$ = Forward diode voltage drop.

It can be seen that the transfer function of the prior art device contains a highly temperature sensitive component in the form of a diode voltage drop. As this is eliminated from the present circuit, a significant improvement in performance over a wide range of temperatures is achieved without the necessity for ratiometricity and temperature compensations.

Figure 3:
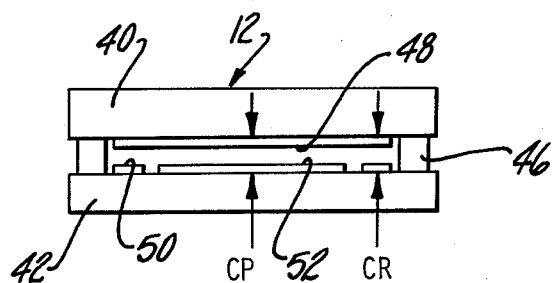
FIG. 3 is a sectional view of a quartz capsule transducer of the type which may be used with the demodulator circuit of the present invention.

Referring now to FIG. 3, a cross sectional view of a typical quartz capsule for varying the values of the capacitors 14 and 16 in response to changes in pressure is shown. The capsule comprises circular quartz plates 40 and 42 assembled in spaced nominally parallel relationship by means of a bonded glass seal 46 of annular configuration. A large circular capacitive electrode 48 is bonded to the inside parallel surface of quartz plate 40. On the opposite facing surface of quartz plate 42 are bonded an annular electrode 50 and, spaced within the annular electrode 50, a circular electrode 52. The electrodes 48 and 50 make up the reference capacitor 14 and the electrodes 48 and 52 make up the primary capacitor 16 in the capsule 12 of FIG. 1.

Because of the geometric configuration of the device shown in FIG. 3 and the evacuation of the space within the glass seal 46, increasing pressure applied to the exterior of the capsule tends to flex or bend the plates 40 and 42 inwardly to reduce the space between the electrodes 48 and 52 by an amount which is greater than the reduction in spacing between the electrodes 48 and 50. Hence, the primary capacitor 16 varies much more than does the reference capacitor 14, thus to provide the capacitance changes previously described with reference to the circuit of FIG. 1. A more detailed description of a quartz capsule of the type shown in FIG. 3 may be found in the SAE technical paper mentioned above.

Figure 4:
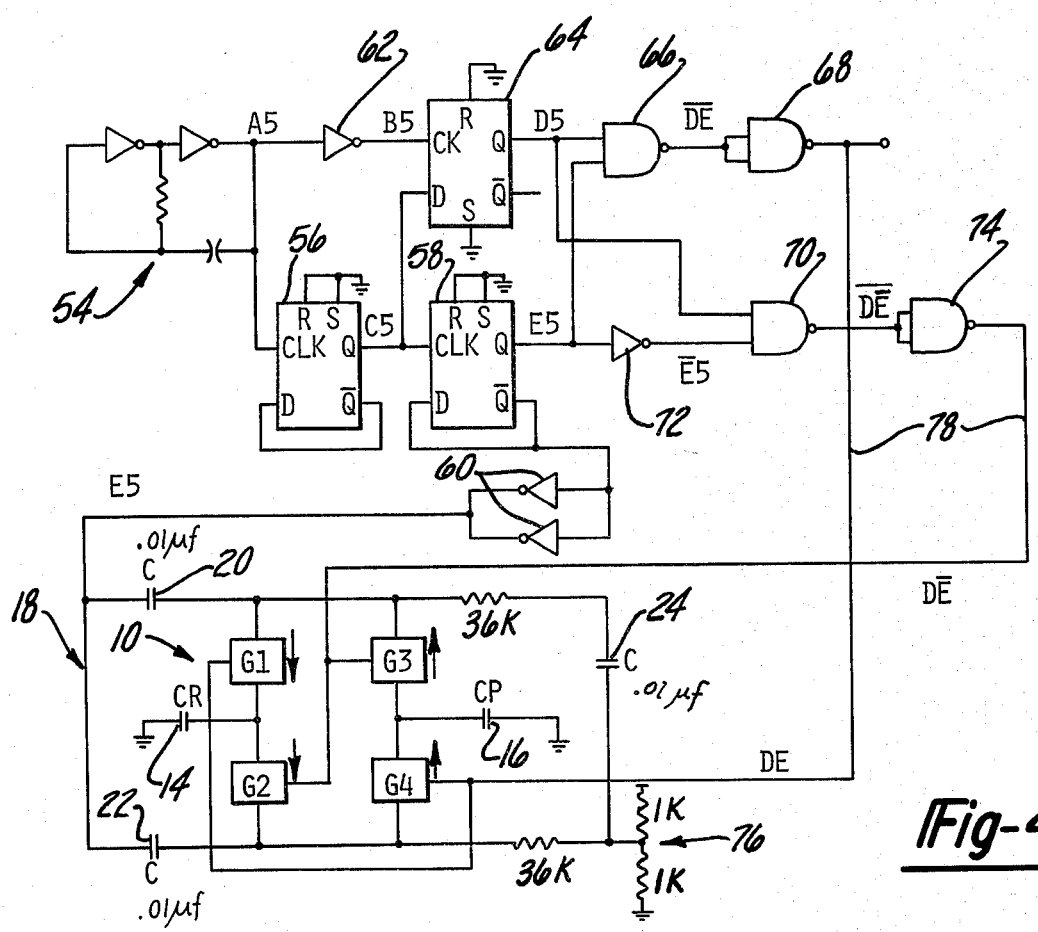
FIG. 4 is a detailed schematic circuit diagram of a demodulator circuit and control signal generator in accordance with the present invention.
Figure 5:
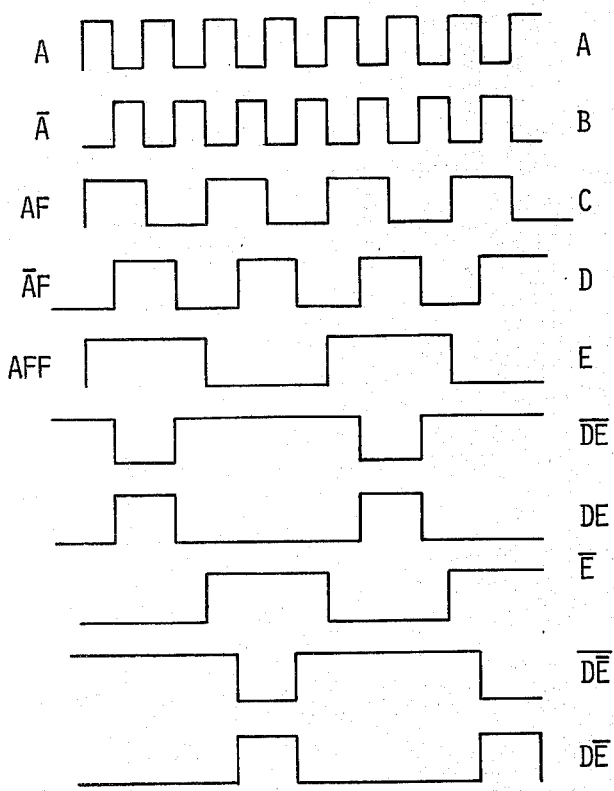
FIG. 5 is a detailed waveform diagram used in describing the operation of the circuit of FIG. 4.

Referring now to FIGS. 4 and 5 a complete circuit comprising both the quad-gate bridge, the excitation voltage source 18 and a control signal source 78 is shown. The capital letters with the subscript 5 designate the points in the circuit of FIG. 4 where the correspondingly lettered waveforms in FIG. 5 appear. In FIG. 4 a solid state oscillator 54 generates a basic timing waveform A which is frequency divided by a factor of four through flip flops 56 and 58. The output $\overline{Q}$ of flip flop 58 is inverted by a parallel connected inverter 60 and forms the excitation signal waveform applied to the quad-gate bridge 10 through capacitors 20 and 22 as previously described with reference to FIG. 1. The excitation waveform is represented by the designation $E_5$ in FIG. 4 and appears as waveform 30 in FIG. 2.

The oscillator signal is also connected through inverter 62 to flip flop 64 to generate waveform D which is phase shifted by 90 degrees and at twice the frequency of the excitation signal. The output of flip flop 64 is connected through gates 66 and 68 to form the gate control signals DE which is applied commonly to the control electrodes of gates G1 and G4. The output of flip flop 64 is also connected to gate 70 where it is logically combined with the inverted output of flip flop 58, inversion taking place at element 72. A second gate 74 operating as an inverter produces the control signal applied to gates G2 and G3. The low ends of gates G2 and G4 are connected through a voltage divider resistor network 76 to provide the bias for the bridge output which appears across capacitor 24 as previously described with reference to FIG. 1. As with FIGS. 1 and 2, the conducting periods of the analog gates G1 through G4 are equal and correspond to the center portions of the excitation voltage half-cycles; in the examples shown the conducting periods are one-half the duration of the excitation voltage half-cycles.

As previously mentioned the gates G1, G2, G3 and G4 are preferably implemented using C-MOS technology. So implemented the circuit of FIGS. 1 and 4 exhibits a number of advantages over the prior art diode-quad circuit. In particular the circuit is relatively insensitive to temperature as described above by elimination of the diode voltage drop component from the transfer function. In addition, the circuit of FIGS. 1 and 4 tends to eliminate the practical limits which are imposed on the output signal by the prior art diode technology and permits an entirely digital approach thereby permitting a substantial reduction in chip size. As is well known to those skilled in the integrated circuit manufacturing art, the reduction of chip size and the digital approach tends to substantially increase the production yield. The circuits of FIGS. 1 and 4 are also characterized by low current drain and can be totally integrated on a single chip for high volume production purposes.

It is to be understood that the invention has been described with reference to an illustrative embodiment and that various modifications, additions and changes to the circuits disclosed herein will be apparent to those skilled in the art without departing from the spirit and scope of the invention as defined in the appended claims.

I claim:

1. A quad-gate demodulator circuit for use with a capacitive transducer of the type having a reference capacitor ($C_r$) and a primary capacitor ($C_p$) which vary differently in response to a quantity being measured wherein the improvement comprises:
    an alternating excitation voltage source (18);
    first and second analog gate means (G1,G4) interconnecting the source with the reference and primary capacitors to charge the capacitors during one polarity of the excitation voltage;
    third and fourth analog gate means (G2,G3) interconnecting the source with the reference and primary capacitors to discharge the capacitors during the other polarity of the excitation voltage;
    control signal generator means (78) connected to said analog gate means for rendering the first and second gate means simultaneously conducting for a first time period which is synchronized with said one excitation voltage polarity and for rendering the third and fourth gate means conducting for a second time period which is synchronized with the other excitation voltage polarity; and
    output means (24) connected to said gate means for developing an output voltage related to the capacitance differential of the reference and primary capacitors.

2. Apparatus as defined in claim 1 wherein the first and second time periods are equal to each other and are shorter in duration than the half-cycles of the excitation voltage.

3. Apparatus as defined in claim 1, wherein the alternating excitation voltage is a squarewave.

4. Apparatus as defined in claim 1, wherein the gate means comprise C-MOS gates.

5. Apparatus as defined in claim 1, further including coupling capacitor means (20,22) connected between the excitation voltage source and said gate means.

6. Apparatus as defined in claim 1, further including a capacitive transducer (12) having at least one element (40) which varies in physical aspect in response to a measured quantity, at least a portion of the primary capacitor being physically associated with said element so as to vary in capacitance along with the physical aspect.

7. A demodulator circuit for use with a capacitive transducer of the type having a reference capaacitor $C_r$ and primary capacitor $C_p$ which vary differently in response to changes in measured quantity where the improvement comprises:
    a first circuit leg (23) comprising the series combination of first and second analog gates G1 and G2;
    a second circuit leg (25) comprising the series combination of third and fourth analog gates G3 and G4;
    the first and second legs being connected in parallel wlith one another;
    an alternating excitation voltage source (18) connected commonly to the opposite ends of the legs (23,25) and generating a voltage having a peak-to-peak voltage value $V_p$;
    output filter means (24) connected in parallel with both of said legs;
    the reference capacitor $C_r$ being connected to the junction between the gates of the first leg (23) to charge through G1 and discharge through G2;
    the primary capacitor $C_p$ being connected to the junction between the gates of the second leg (25) to charge through G4 and discharge through G3; and
    means synchronized with the excitation voltage to render G1 and G4 simultaneously conducting for a first time period corresponding to a portion of one excitation voltage polarity and to render G2 and G3 simultaneously conducting for a second time period corresponding to a portion of the other excitation voltage polarity;
    whereby the voltage $V_o$ across the output filter means follows the relationship $$V_o = V_p(C_p - C_r)/(C_p + C_r).$$

8. Apparatus as defined in claim 7, wherein the excitation voltage is substantially a squarewave.

9. Apparatus as defined in claim 7, wherein said gates are C-MOS gates.

10. Apparatus as defined in claim 7, wherein said excitation voltage source and said means synchronized therewith for rendering the gates conducting are derived from a common logic circuit having an oscillator and logic means for frequency dividing and phase shifting voltage waveforms derived from the oscillator.

11. Apparatus as defined in claim 7, further comprising a quartz capsule transducer containing the reference and primary capacitors to produce changes in said capacitors in response to a measured quantity such as a fluid pressure.

12. Apparatus as defined in claim 7, wherein the conducting time periods are equal in length and occur substantially during the center portions of the excitation voltage half-cycles.

* * * * *